James Bongiorni
INVENTOR.

Dec. 12, 1950 J. BONGIORNI 2,534,101
MEAT BLOCK SCRAPING MACHINE HAVING SPRING
PRESSED SUPPORTING WHEELS
Filed Jan. 22, 1948 2 Sheets-Sheet 2

James Bongiorni
INVENTOR.

Patented Dec. 12, 1950

2,534,101

UNITED STATES PATENT OFFICE 2,534,101

MEAT BLOCK SCRAPING MACHINE HAVING SPRING PRESSED SUPPORTING WHEELS

James Bongiorni, Washington, Pa., assignor of thirty per cent to Rudolph Baronick, Washington, Pa.

Application January 22, 1948, Serial No. 3,703

2 Claims. (Cl. 15—93)

This invention relates to a meat block cleaner and top surfacer and has for its primary object the provision of a machine adapted to mechanically and effectively scrub and scour wood meat blocks.

Another object of the invention is the provision of a top surfacing machine which may readily and easily be manipulated to any desired place on the meat block.

Still another object of the invention is the provision of a machine with electrically driven steel wire rotary brushes which may be made to engage the top surface of the meat block at will by mere manual pressure on the casing of the machine.

A still further object of the invention is the provision of a machine which may more effectively scrub and scour a larger surface of the meat block.

The main features of the invention comprise a casing, a hand knob on said casing for manipulating the surfacer, means for supporting a motor in said casing, a plurality of spaced, parallel horizontal rotary steel wire brushes, appropriate gearing to actuate all the brushes simultaneously, wheels or casters pivotally secured to the base of said casing, and resilient means adjacent said wheels responsive to pressure on the hand knob whereby the rotary brushes may be made to engage the surface of the meat block when desired.

These, together with various ancillary objects and features of the invention which will later become apparent as the following description proceeds, are attained by the device, a preferred embodiment of which has been illustrated by way of example only in the accompanying drawings, wherein.

Specific reference is now made to the drawings. In the several views in the accompanying drawings and in the following specification, similar reference characters indicate corresponding elements throughout.

Figures 1, 2:
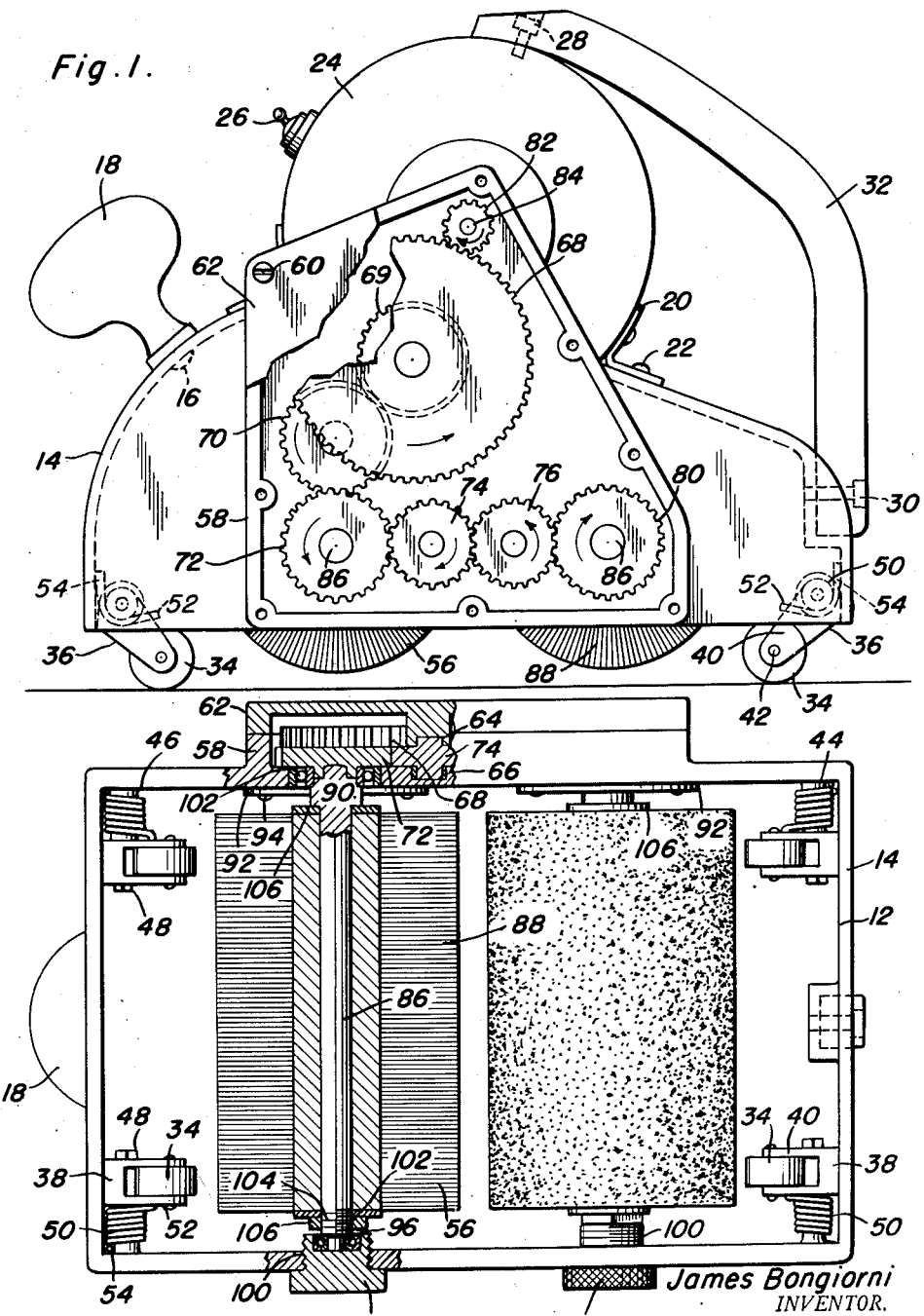
Figure 1 is a side elevational view of the invention with a portion of the gear cover cut away.
Figure 2 is a bottom plan view of the invention.
Figures 3, 4:
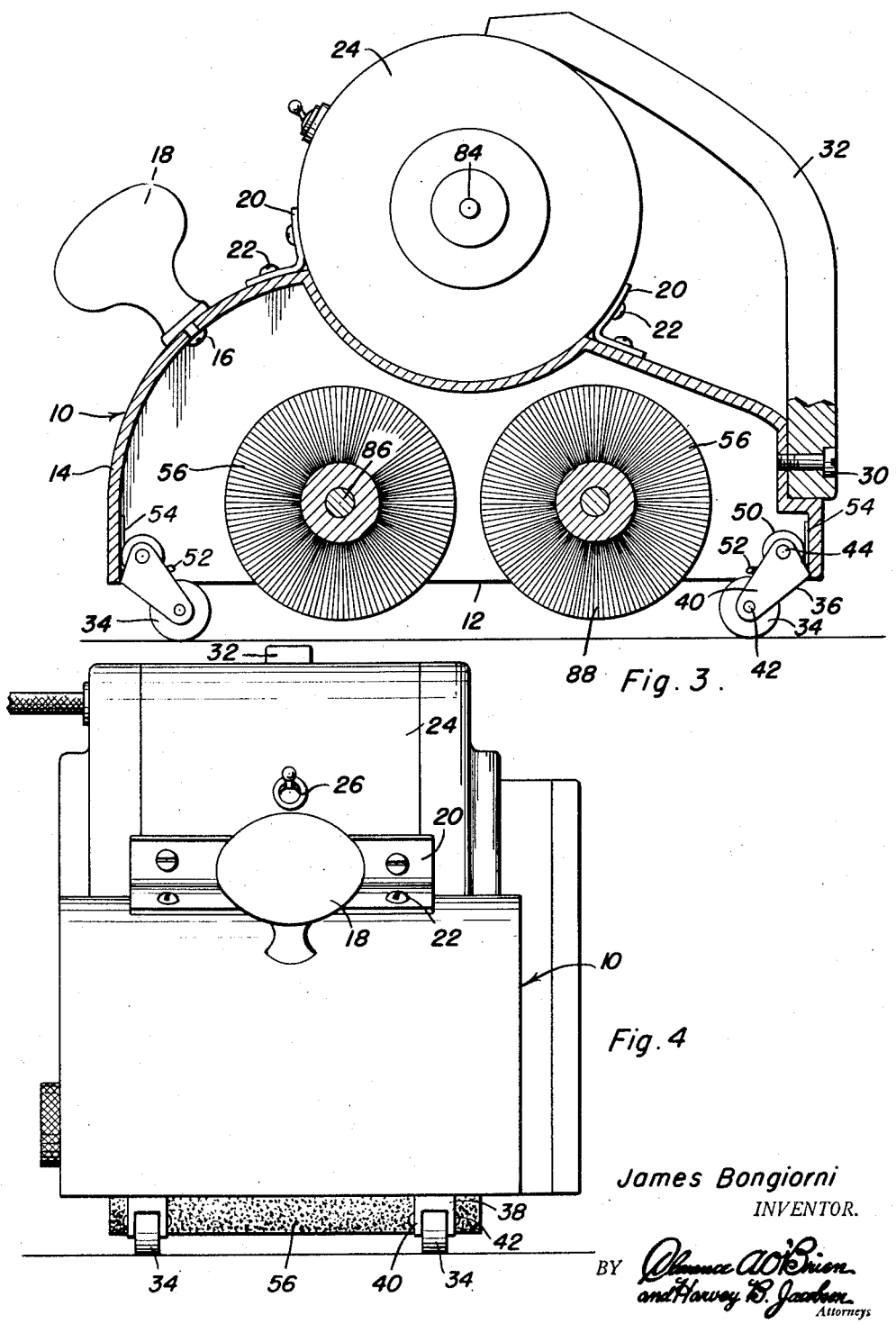
Figure 3 is a longitudinal vertical sectional view of the invention some parts being shown in elevation.
Figure 4 is a front elevational view of the invention.

Generally indicated at 10 is a housing or casing having a rectangular base contour 12 and a curved hollow top section 14 to which is removably secured by means of a screw 16 a hand knob 18 for manipulating the entire machine.

Removably mounted on the casing adjacent the hand knob by means of angle irons 20 and appropriate screws or bolts 22, a motor 24 is provided with a toggle switch 26 therein for starting and stopping the motor. Removably secured at one end to the motor as by recessed screw or bolt 28 and at the other end to the casing 10 as by screw or bolt 30 is an arcuate rod or handle 32. Thus by grasping the hand knob in one hand and handle 32 in the other, the machine can be drawn back and forth over the meat block.

At the bottom of the casing and at its corners, wheels 34 are pivotally mounted in the following manner. A bifurcated support 36 having a vertical web portion 38 and angulated arms 40 is pivoted to one side of the casing via pin 44 which is rigidly secured to the casing. The ends of the arms 40 have apertures therein through which a pin 42 is journaled for pivotally engaging the wheels. The tops of the arms are also provided with apertures therein through which a screw or bolt 44 is journaled which abuts at one end, the other side of the casing as at 46 and receives a fastening nut 48 at the other. Wound around the bolt 44 between the support 36 and the wall 14, a spring 50 is provided, one end of which spring overlies one of the furcations or arms 40 as at 52, the other end abutting the casing as at 54. Thus it will be seen that the springs normally urge the wheels down and consequently the rotary brushes 56 up. By applying pressure on the hand knob 18 and handle 32, the wheels 34 pivot upwardly against the springs 50, thus lowering the brushes 56 on to the meat block. Releasing the pressure, automatically lowers the wheels 34 and raises the brushes 56 to their normal position.

Casing 10 is provided with a further gear casing or housing 58 which is either welded to or cast with casing 10. Removably secured to the housing 58 as by screws or bolts 60 is a gear cover 62. This cover may be removed when the gears are to be cleaned, lubricated, or otherwise repaired.

Suitably mounted between the inner face of housing 58 and casing 10 as at 64 and 66 are found vertically disposed spur gears 68, 69, 70, 72, 74, 76, and 80. When the motor is started spur gear 82 suitably mounted on motor shaft 84 is caused to rotate in the direction of the arrow shown in Figure 1 with the result that the remainder of the gears are actuated to rotate in the direction of the arrows shown in Figure 1. It will be noted that gears 72 and 80 are fixedly secured to the shafts 86 horizontally disposed through the rotary wire brushes 88. Thus it will be seen that the rotary brushes are made to rotate in opposite directions.

The brush shafts 86 are suitably and rotatably mounted at the opposite inner faces of casing 10 through appropriate journals. At one of these faces, journal 90 is removably affixed thereto by means of a plate 92 and screws or bolts 94 provided therein for fastening purposes. At the opposing face, a journal 96 is provided in a knurled screw 98 which threadably engages the face of casing 10 as at 100. Appropriate ball bearings 102 are also provided around the shafts 86 in both journals 90 and 96.

Suitably mounted on the shafts 86 along their entire length are found cylindrical steel wire brushes 88. Behind the ends of these brushes 88 between said brushes and the journals, the shafts 86 are threaded as at 104 to receive nuts 106 for adjustably positioning the brushes on the shafts.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A meat block cleaner and top surfacer comprising in combination a curved, hollow casing having a substantially rectangular contour at its base, a pair of opposing handle means carried by said casing, a motor removably mounted on said casing, a pair of spaced parallel horizontal cylindrical rotary wire brushes, gear means connecting said motor with said brushes for simultaneously actuating said brushes in opposite rotational directions, wheels, pivoted support means for securing said wheels to said casing at the base corners thereof for vertical movement of said wheels, and resilient means carried by said support means and engaging the end walls of the casing for urging said support means downwardly yet allowing the wheels to yield to downward force on the handles to lower said brushes onto the meat block, said wheel support means including bifurcated plates depending from said casing substantially at the corners thereof having furcations inclined downwardly and towards the center of said casing and an upstanding web, fastening engaging apertures in the free extremities of said furcations, fastening means journaled in said apertures for rotatably supporting the wheels, fastening engaging apertures at the ends of said furcations adjacent the web, and fastening means fixedly attached to the inner side faces of the said casing and journaled in said last-mentioned apertures for pivotally supporting the said bifurcated plates.

2. The combination of claim 1 wherein said resilient means includes springs engaging said last-mentioned fastening means, one end of which springs abut an inner face of said casing and the other end of which springs overlie the upper edges of one of said furcations whereby said wheels are urged downwardly towards the meat block.

JAMES BONGIORNI.

REFERENCES CITED

The following references are of record in the file of this patent:

UNITED STATES PATENTS

| Number | Name | Date |
| --- | --- | --- |
| 595,526 | Coldwell | Dec. 14, 1897 |
| 1,087,068 | Lueck | Feb. 10, 1914 |
| 1,464,031 | Daly | Aug. 7, 1923 |
| 1,536,687 | Oatey | May 5, 1925 |
| 1,580,821 | Gevaerts | Apr. 13, 1926 |
| 1,607,500 | Agar et al. | Nov. 16, 1926 |
| 1,608,920 | Anderson | Nov. 30, 1926 |
| 1,663,059 | Peterson | Mar. 20, 1928 |
| 1,718,179 | Olson | June 18, 1929 |
| 1,796,700 | Ardron | Mar. 17, 1931 |
| 1,867,284 | Smidley | July 12, 1932 |
| 1,950,450 | Leathers | Mar. 13, 1934 |
| 2,015,220 | Harkin | Sept. 24, 1935 |

FOREIGN PATENTS

| Number | Country | Date |
| --- | --- | --- |
| 77,226 | Switzerland | Dec. 13, 1917 |
| 232,073 | Great Britain | Apr. 16, 1925 |
| 244,735 | Great Britain | Nov. 25, 1926 |
| 434,161 | Great Britain | Aug. 27, 1935 |